United States Patent Office 2,763,641
Patented Sept. 18, 1956

2,763,641

AZO DYESTUFFS OF THE OXAZINE SERIES

Karl Seitz, Neu-Allschwil, and Walter Anderau, Binningen, Switzerland, assignors to Ciba Limited, Basel, Switzerland, a Swiss firm No Drawing. Application December 27, 1954, Serial No. 477,936

Claims priority, application Switzerland December 29, 1953

6 Claims. (Cl. 260—153)

This invention provides new dyestuffs of the oxazine series, which correspond to the general formula

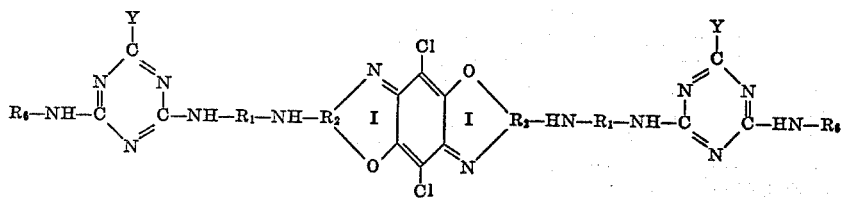

in which $R_1$ represents a benzene radical, $R_2$ represents a benzene ring fused on to the hetero ring I and containing a sulfonic acid group, $R_6$ represents a radical free from oxazine rings, and Y represents an amino group, a hydroxyl group or a halogen atom.

These new dyestuffs are suitable for dyeing and printing a very wide variety of materials, for example those of animal origin, such as leather, silk and wool or artificial fibers of casein, or a superpolyamide or superpolyurethane. They possess above all a good affinity for cellulose-containing materials such as paper, linen, cotton, and products composed of regenerated cellulose such as artificial silk, staple fibers and cellulose foils. Dyeings produced on cellulose-containing materials with the new dyestuffs are in general distinguished by the purity of their tint and their good fastness to light. Moreover, the fastness to light is generally not impaired to any substantial extent by the usual treatments with anticreasing agents.

The invention also provides a process for making the above dyestuffs, wherein two molecular proportions of a cyanuric halide are condensed, on the one hand, with one molecular proportion of a diamino-dioxazine of the formula (1)

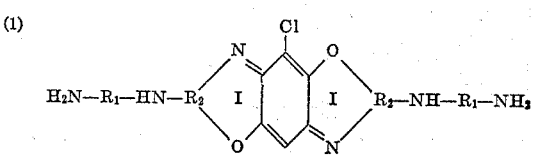

in which $R_1$ represents a benzene radical, and $R_2$ represents a benzene ring fused on to the hetero-ring I and containing a sulfonic acid group, and, on the other, with 2 molecular proportions of a monamine free from oxazine rings, and, if desired, any halogen atoms still present in the triazine radical are exchanged for amino groups.

Dioxazines of the above constitution, for example, those of the formula (2)

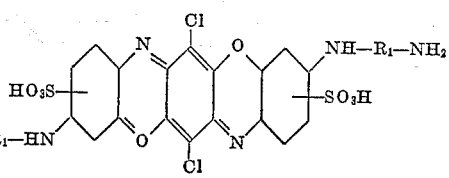

in which $R_1$ has the meaning given above, can be made by methods in themselves known. Thus, for example, by condensing one molecular proportion of 2:3:5:6-tetrachloroquinone (chloranil) with 2 molecular proportions of a compound of the formula (3)

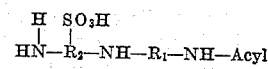

in which $R_1$ and $R_2$ represent benzene radicals, in which all the —NH— groups are in para-position relatively to one another and the sulfonic acid group is in ortho-position relatively to the —NH—$R_1$ group, there is obtained a compound of the formula (4)

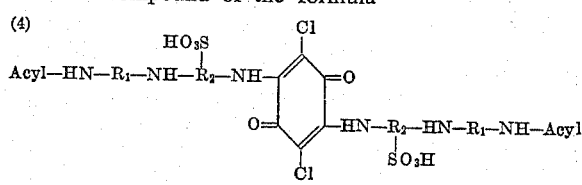

and the latter compound is treated with an agent capable of bringing about ring closure and the acyl groups are split off. The ring closure is advantageously carried out with the aid of sulfuric acid containing free sulfur trioxide (oleum) and for splitting off the acyl groups it is of advantage, for example, to treat the product at a high temperature with dilute hydrochloric acid.

As already indicated, the cyanuric halide may be reacted, for example, in the molecular ratio 2:1 with the diamino-dioxazine of the Formula 1, and the condensation product so obtained is then further condensed in the molecular ratio 1:2 with any desired monamine free from oxazine rings. Alternatively the sequence of operations may be reversed by condensing the halogen-compound with the monamine free from oxazine rings in equimolecular ratio, and then reacting the resulting condensation product with the diamino-dioxazine of the Formula 1, in the molecular ratio 2:1. Any desired primary or secondary monamine may be used, for example, a cyclic monamine, which contains a heterocyclic ring or aromatic ring, such as a naphthalene or benzene ring, or a more highly condensed ring system, and if desired, two or more non-condensed rings which may be identical or different. By suitably choosing the monamine the tint of the final dyestuff can be influenced. Thus, for example, colorless to weakly colored monamines, or those having no dyestuff character, such as

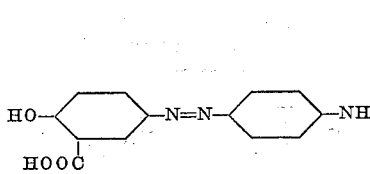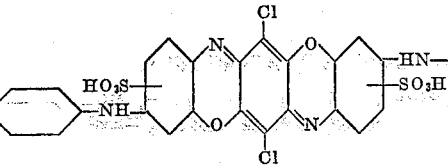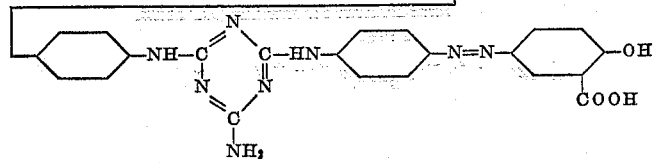

aminobenzenes, aminonaphthalenes, aminodiphenyl-compounds, aminoarylaminobenzenes, aminochrysene, aminopyrene, aminobenzene carboxylic acids, amino-hydroxybenzene carboxylic acids, cyclohexylamine and aminophenylbenzthiazoles.

Among the colored monamines the yellow dyestuffs containing an amino group are of special importance. They may belong to various classes of dyestuffs, for example, there may be used monamines of the azine or anthraquinone series. Especially suitable are yellow monamino-azo-dyestuffs, and among these there may be mentioned above all the amino-monoazo-dyestuffs of the formula (5)     $H_2N—R_3—N=N—R_4$ and (6)     $H_2N—R_3—X—R_5—X—R_4$ In this formula $R_3$, $R_4$ and $R_5$ represent benzene radicals, and in the Formula 6 one X represents an azo linkage and the other X a —CO—NH— group. The bridge members (—N=N— and —CO—NH—) between the benzene radicals and the amino groups are advantageously in meta- or para-position relatively to one another. The benzene radicals may contain further substituents. For example, the residue $R_4$ may contain a hydroxyl group in para-position to the —N=N— or —CO—NH— group and a carboxylic acid group in ortho-position to the hydroxyl group.

After the condensations with the diamino-dioxazine and the monamine have been carried out, the three halogen atoms still present in the two triazine rings may, if desired, be exchanged in known manner for hydroxyl or amino groups. The condensations of the halogen-compounds with the amino-oxazines or with the further amines may also be carried out in known manner.

The following examples illustrate the invention, the parts and percentages being by weight:

Example 1

A solution of 200 parts of water, 100 parts of acetone, 5.14 parts of 4-amino-4'-hydroxy-1:1'-azobenzene-3'-carboxylic acid and 1.8 parts of anhydrous sodium acetate is mixed at 0° C., while stirring, with a solution of 4 parts of cyanuric chloride in 50 parts of acetone. A yellow suspension is formed; after a few minutes only, free amine can no longer be detected.

The primary condensation product so obtained is then added, while stirring, to 900 parts of a blue solution of the dioxazine sulfonic acid, rendered alkaline with sodium carbonate, and which solution is prepared as described below. The whole is heated up to 40–45° C. and stirred at that temperature for two hours. By occasionally introducing a saturated solution of sodium carbonate dropwise care is taken that the pH value of the solution remains between 8 and 9. 25 parts of ammonia solution of 20 per cent strength are then added, and the reaction mixture is stirred for a further two hours at 70–75° C. The whole is allowed to cool, the precipitated dyestuff of the formula is filtered off, and the latter is washed with a saturated solution of sodium chloride. The dyestuff dyes cotton green tints of good fastness to light.

Green dyestuffs having similar properties are obtained by using, instead of 4-amino-4'-hydroxy-1:1'-azo-benzene-3'-carboxylic acid, a yellow amino-monoazo-dyestuff of one of the following formulae:

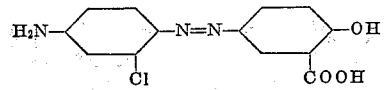

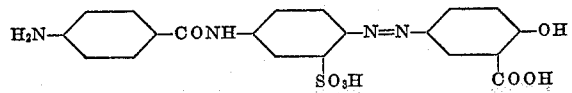

or

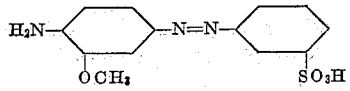

The blue dyestuff solution mentioned above is prepared as follows:

24.6 parts of chloranil, 64.2 parts of 4-amino-4'-acetylamino-diphenylamine-2-sulfonic acid and 9.3 parts of magnesium oxide are stirred in 500 parts of water for 6 hours at 60–65° C. There is obtained a suspension having a dark blue color. After cooling the suspension, the precipitated condensation product is filtered off, washed with water and dried in vacuo at 90–100° C.

8.37 parts of the condensation product so obtained are introduced into a mixture of 15 parts of monohydrate and 15 parts of oleum of 27 per cent strength, and the whole is stirred for 12 hours at room temperature. The mixture is poured on to 250 parts of ice, and the dioxazine sulfonic acid is filtered off with suction and washed with a saturated solution of sodium chloride. The dyestuff paste is then stirred with 165 parts of hydrochloric acid of 10 per cent strength for 3 hours at 90–95° C., whereby the acetyl amino groups are hydrolysed. The resulting dyestuff solution is mixed with sodium carbonate until it becomes alkaline to Brilliant Yellow paper, and is then diluted with water to 900 parts by volume.

Example 2

To a solution of 200 parts of water, 50 parts of acetone, 3.06 parts of 4-amino-1-hydroxybenzene-2-carboxylic acid and 1.8 parts of anhydrous sodium acetate is added at 0° C., while stirring, a solution of 4 parts of cyanuric chloride in 50 parts of acetone. After stirring the whole for 15 minutes at 0° C. the primary condensation product is formed, and free 4-amino-1-hydroxy-benzene-2-carboxylic acid can no longer be detected.

The primary condensation product is then condensed in the manner described in Example 1 with the dioxazine sulfonic acid, the preparation of which is also described in Example 1.

The dyestuff so obtained corresponds to the formula

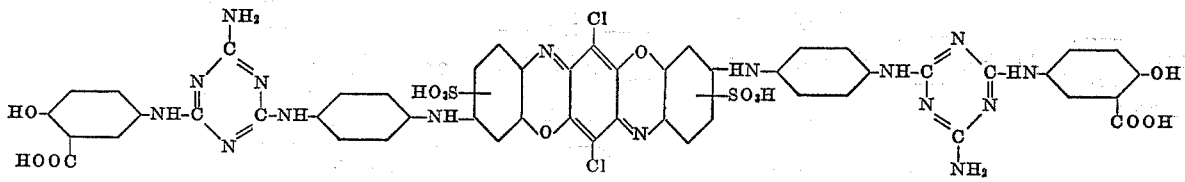

and dyes cotton pure blue tints of very good fastness to light.

Dyestuffs having similar properties are obtained by using, instead of 4-amino-1-hydroxybenzene-2-carboxylic acid, aminobenzene, cyclohexylamine, 1-amino-benzene-4-carboxylic acid, 1-amino-4-acetylaminobenzene, 4-amino-1:1'-diphenyl, 1 - amino - 4 - benzoylaminobenzene, 1-amino-4-cinnamylaminobenzene, 2-aminochrysene, 3-aminopyrene or 2 - (4'-aminophenyl) - 6 - methyl-benzthiazole.

*Example 3*

A solution of 4 parts of cyanuric chloride in 100 parts of acetone is added at 0° C., while stirring to 900 parts of a weakly acetic acid solution of the dioxazine sulfonic acid prepared as described in Example 1, and to which

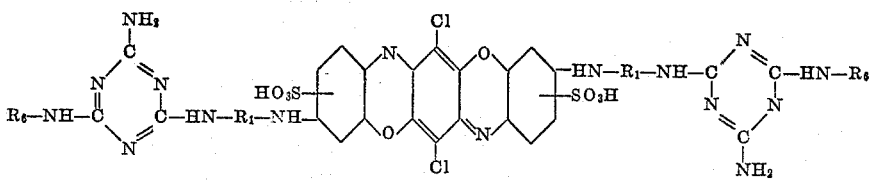

solution has been added a further 1.8 parts of anhydrous sodium acetate. The whole is stirred for one hour at 0–5° C. The above solution is then poured into a solution, rendered alkaline with sodium carbonate, of 5.04 parts of 4 - amino - 4'-hydroxy - 1:1'-azobenzene - 3'-carboxylic

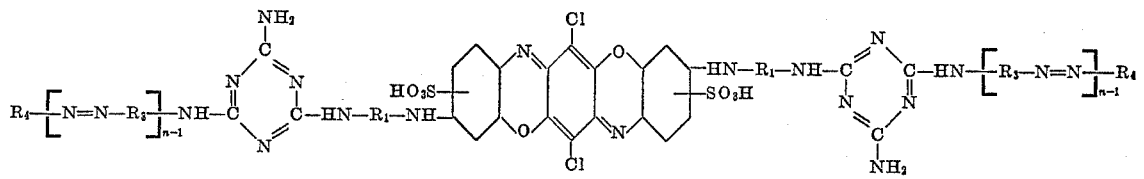

acid in 500 parts of water, and the whole is heated up to 40–45° C. and stirred for 2 hours at that temperature. There are then added 50 parts of an ammonia solution of 20 per cent strength, and the whole is stirred for a further 2 hours at 70–75° C. By scattering sodium chloride on to the mixture the dyestuff is precipitated, and

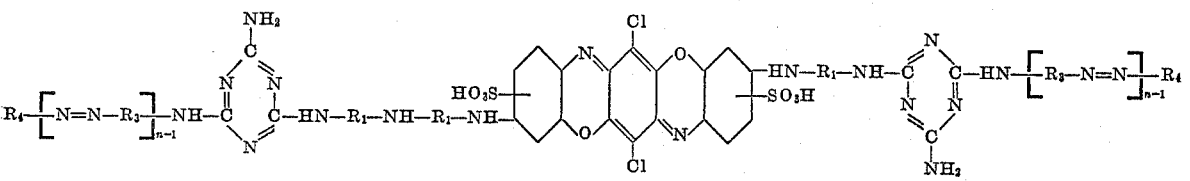

the dyestuff is filtered off after cooling and washed with a saturated solution of sodium chloride. The dyestuff dyes cotton green tints which are similar to those of the dyeings produced by the dyestuff obtained as described in the first and second paragraphs of Example 1.

*Example 4*

100 parts of cotton are entered at 50° C. into a dyebath which contains in 3000 parts of water 1 part of the dyestuff obtainable as described in the first and second paragraphs of Example 1, the temperature is raised to 90° C. in the course of ½ hour, and 30 parts of crystalline sodium sulfate are added. Dyeing is then carried on for one hour at 90–95° C., and there is obtained a green dyeing of good fastness to light.

What is claimed is:

1. A dyestuff of the oxazine series corresponding to the formula

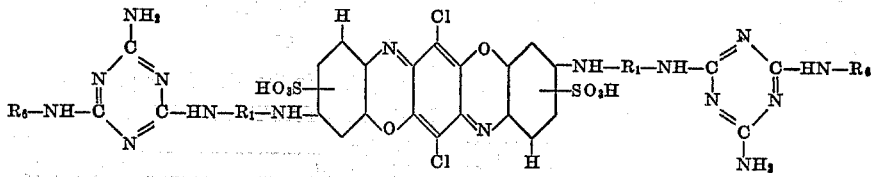

in which $R_1$ represents a benzene radical to which the —NH— groups are bound in para-position and $R_6$ represents an aromatic radical.

2. A dyestuff of the oxazine series corresponding to the formula in which $R_1$ represents a benzene radical to which the —NH— groups are bound in para-position, and $R_6$ represents an aromatic radical of the benzene series.

3. A dyestuff of the oxazine series corresponding to the formula in which $R_1$ represents a benzine radical to which the —NH— groups are bound in para-position, $R_3$ and $R_4$ each represents a benzene radical and $n$ represents a whole number of at the most 2.

4. A dyestuff of the oxazine series corresponding to the formula in which $R_1$ represents a benzine radical to which the —NH— groups are bound in para-position, $R_3$ and $R_4$ each represents a benzene radical, the radical $R_4$ contains a hydroxyl group in para-position to the azo-linkage and a carboxylic acid group in ortho-position to said hydroxyl group, and $n$ represents a whole number of at the most 2.

5. The dyestuff of the formula
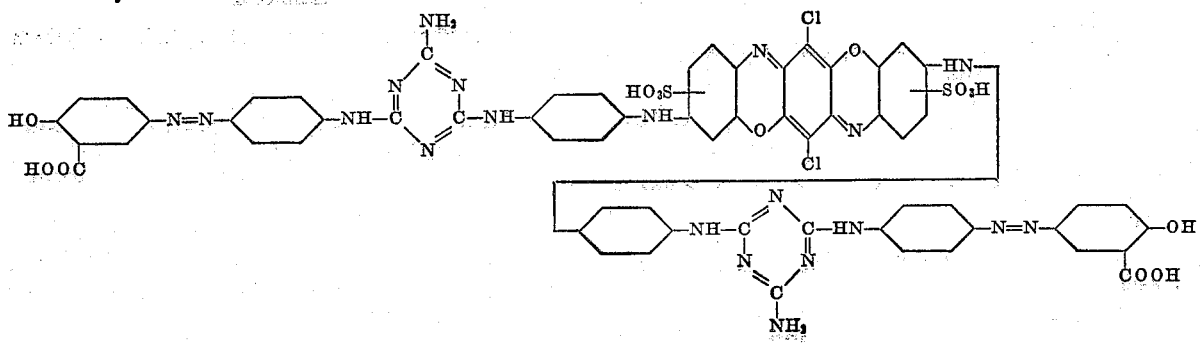
6. The dyestuff of the formula
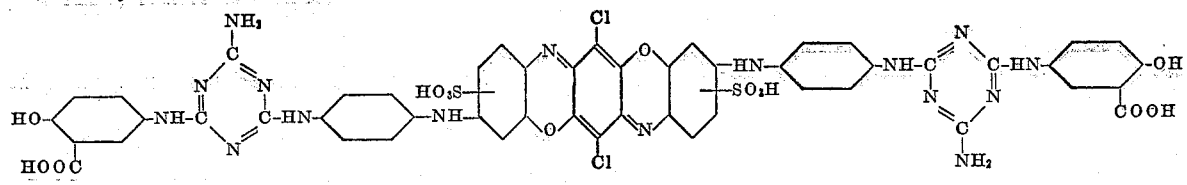
References Cited in the file of this patent
UNITED STATES PATENTS
| | | |
|---|---|---|
| 2,161,622 | Haller | June 6, 1939 |
| 2,192,127 | Ebel et al. | Feb. 27, 1940 |